United States Patent [19]

Sayles

[11] 4,304,185
[45] Dec. 8, 1981

[54] LINER-BARRIER FOR ULTRAHIGH BURNING RATE PROPELLANTS

[75] Inventor: David C. Sayles, Huntsville, Ala.

[73] Assignee: The United States of America as represented by the Secretary of the Army, Washington, D.C.

[21] Appl. No.: 833,321

[22] Filed: Sep. 6, 1977

[51] Int. Cl.³ .......................... F42B 1/00; C06B 45/10
[52] U.S. Cl. .................................. 102/290; 149/2; 149/19.2
[58] Field of Search .................. 149/19.2, 2; 102/103, 102/290

[56] References Cited

U.S. PATENT DOCUMENTS

| | | | |
|---|---|---|---|
| 3,079,289 | 2/1963 | George et al. | 154/43 |
| 3,426,528 | 2/1969 | Mangum et al. | 102/103 |
| 4,009,231 | 2/1977 | Wasserman et al. | 102/103 |
| 4,034,675 | 7/1977 | Sayles | 102/102 |
| 4,034,676 | 7/1977 | Daume | 102/103 |

Primary Examiner—Edward A. Miller

Attorney, Agent, or Firm—William G. Gapcynski; Werten F. W. Bellamy; Jack W. Voigt

[57] ABSTRACT

A highly effective liner-barrier is disclosed for use with carborane-containing ultrahigh burning rate propellants. The liner-barrier includes a resinous matrix selected from an epoxy, polysulfide, and a near neutral phenolic resinous liner-barrier composition, and a leafing aluminum flake incorporated therein. When this liner-barrier is applied to the surface of a rocket motor case, or insulation when used, the leafing aluminum flake floats to a region near the surface of the resin. The liner-barrier is cured to yield a leafing aluminum flake sub-surface layer which markedly reduces the permeability of the liner-barrier by the carboranyl burning rate catalysts which results from the migration or diffusion of the carborane from the propellant. The ultrahigh burning rate propellant is compatible with and forms a secure bond to the liner-barrier. These requirements of compatibility and forming a secure bond are essential for the field of use.

1 Claim, No Drawings

LINER-BARRIER FOR ULTRAHIGH BURNING RATE PROPELLANTS

DEDICATORY CLAUSE

The invention described herein may be manufactured, used, and licensed by or for the Government for governmental purposes without the payment to me of any royalties thereon.

BACKGROUND OF THE INVENTION

Solid propelled rocket motors are designed to have many shapes and sizes. The solid propellant composition can be cast into a rocket motor case, with or without insulation, and cured in the rocket motor case. The solid propellant grain can also be formed and then inserted into a rocket motor case with or without insulation. Additionally, solid propellant rocket motors have been constructed by winding glass fibers onto the propellant grain while the glass fiber is coated with a curable resinous material that is subsequently cured.

All of the techniques for constructing rocket motors include some procedure for ensuring that the grain is integral with rocket motor case, insulation, is used, and the liner material. If voids exist between the propellant grain and the adjacent members of the rocket motor, numerous problems can develop which can attribute to failure of the rocket motor and the mission intended therefor. Therefore, the liner composition or the liner-barrier composition that is used to bond the propellant grain to either the liner or the case must meet at least two basic requirements. The liner-barrier or liner composition has to be compatible with, and bond satisfactorily to the propellant and to the insulation and other inert components of the rocket motor. The liner composition or liner-barrier composition has another problem to compete against, that is, the problem of plasticizer-catalyst migration after the propellant grain is cast. This migration problem can cause a development of a void and penetration of insulation material to produce undesirable smoke from combustion of insulation material and perhaps, complete failure of the rocket motor unless prior safeguards are taken to resist the attack of migrated plasticizer-catalyst at the interface of the propellant and liner. Therefore, it is essential that catalyst migration be discouraged or preferably eliminated by the liner-barrier composition to enable the continued use of the desirable carborane catalysts.

An object of this invention is to provide an improvement to liner-barrier composition which reduces the permeability of the liner-barrier to migrated plasticizer-catalysts.

A primary object of this invention is to provide a highly effective liner-barrier for use with carborane-containing ultrahigh burning rate propellants.

SUMMARY OF THE INVENTION

Leafing aluminum flake is incorporated into an uncured resinous composition which is subsequently cured to form the liner-barrier matrix of carborane-containing ultrahigh burning rate propellants. When the liner-barrier is applied to the surface of the motor case, or insulation when used, the leafing aluminum flake floats to a region near the surface of the resin as the curing proceeds and, in this manner, forms a leafing aluminum flake sub-surface layer which markedly reduces the permeability of the liner-barrier by the carboranyl burning rate catalysts which results from the migration or diffusion of the carborane from the propellant. A tacky layer of the selected resinous compound, above and below the leafing aluminum flake sub-surface layer, ensures that the propellant is securely bonded to the rocket motor case or insulation as the resinous compound is cured.

DESCRIPTION OF THE PREFERRED EMBODIMENT

An improvement of liner-barrier compositions is achieved by using leafing aluminum flake in an amount of about 2 to about 5 weight percent which is added to an uncured resinous composition used to form the resinous matrix for bonding an ultrahigh burning rate propellant grain to a rocket motor case. When insulation is used between the rocket motor case and the specified type propellant grain, the improved liner-barrier serves to bond the propellant grain to the insulation. The added leafing aluminum flake floats to a region near the surface of the resin when the liner-barrier is applied and forms a sub-surface layer between the grain and the insulation or motor case when the resinous matrix is cured. This sub-surface layer markedly reduces the permeability of the liner-barrier by the carboranyl burning rate catalyst which results from the migration or diffusion of the carborane catalyst from the propellant.

The liner-barrier composition can be any epoxy, polysulfide and other synthetic rubbers, or a near neutral phenolic resinous composition which will securely bond the propellant grain to the rocket motor case or insulation when used.

A representative propellant to which the liner-barrier must bond satisfactorily to would have the following range of ingredients in weight percent: 5-7 hydroxyl-terminated polybutadiene binder, 8-10 carborane selected from the carboranes consisting of n-hexylcarborane, 60/40 mixture of carboranylmethyl ethyl sulfide and carboranylmethyl propyl sulfide, and carboranylmethyl propionate, and 10-12 aluminum (spheroidal) which is part of a total solids of about 86-87 weight percent which additionally is comprised of ammonium perchlorate oxidizer having a specific surface area as calculated from Mine Safety Appliance (MSA) in the range of about 3-7 square meters per gram.

The leafing aluminum flake employed in this invention is well known as shown by the publications—Edwards, J. D. and Wray, R. I., "Aluminum Paint and Powder", 3d ed. (Reinhold 1955), U.S. Pat. No. 1,858,368 issued to Warren K. Lewis, and U.S. Pat. No. 3,079,289 issued to Melvin F. George, Jr. et al. The prior art thus teaches the use of bronze, aluminum powder, or leafing aluminum flake in a resin matrix as a coating with limited permeability which therefore protects a coated surface from the corrosive effects of foreign matter. The patent to Lewis teaches the using of a metal base paint as a first coating for a metal surface. A second coating which is constituted of an animal glue and a fixing agent (e.g., paraldehyde) is then applied over the first coating. The fixing is to chemically render the glue insoluble in water. The patent to George et al teaches the use of leafing aluminum powder to increase the dielectric constant of expanded ceramic pellets used in radome materials.

The function performed by leafing aluminum flake as disclosed by this invention discloses a new use for an old material which unexpectedly forms a sub-surface layer that markedly reduces the permeability of the liner-barrier by the carboranyl burning rate catalysts. The use of leafing aluminum flake as disclosed by this invention is applicable to any propellant employing a carborane catalyst of the type which is subject to migration during manufacture and/or storage after manufacture. The floating action of the leafing aluminum flake after being added to the selected resinous compound results in the leafing aluminum flake forming a sub-surface layer in the liner matrix with a layer of the selected resinous compound above and below the sub-surface layer for securely bonding the propellant to the motor case or motor case insulation. The leafing aluminum flake as sold under Alcoa 609 or ERECO2010 are satisfactory for use in accordance with this invention. The formulation of the liner-barrier composition would normally be near neutral except for certain phenolic resins; however, the phenolic resin should be formulated to yield a near neutral composition as the acidic phenolic resin tends to precipitate the leafing aluminum flake rather than encourage the floating action as required for use in accordance with this invention.

A typical liner barrier composition B of this invention is compared in Table I with a prior art liner-barrier composition A for NF propellants. The compounding and testing procedure is outlined below Table I.

TABLE I
COMPARISON OF
LINER-BARRIER COMPOSITION FOR NF PROPELLANTS

| INGREDIENT* | LINER-BARRIER | |
|---|---|---|
| | A | B |
| | PARTS BY WEIGHT | |
| Polyvinyl Formal | 8.0 | 8.0 |
| Epon 1001 | 6.0 | 6.0 |
| Methylene Chloride | 80.0 | 80.0 |
| Leafing Aluminum | 0.0 | 2.0 |
| Triphenylbismuthine | 1.0 | 1.0 |
| Isophorone Diisocyanate | 3.0 | 3.0 |

*Compounding Procedure
Polyvinyl formal and Epon 1001 are dispersed in the CH₂Cl₂ until completely solubilized (48-72 hours). The leafing aluminum, triphenylbismuthine and isophorone diisocyanate are added before use.
Testing Procedures
The liner-barrier is poured into an aluminum dish and the solvent is allowed to evaporate. The product is then cut into specimens having dimensions of 1" × ⅛" × ⅛".

The comparison of liner-barrier effectiveness for Composition A and Composition B is set forth in Table II. The test data was obtained on test specimens prepared as described above and tested as described below Table II.

TABLE II
COMPARISON OF LINER-BARRIER EFFECTIVENESS*

| ELAPSED TIME (hrs) | WEIGHT CHANGE IN SPECIMEN (wt %) | |
|---|---|---|
| | A | B |
| 24 | −0.052 | −0.00 |
| 48 | −0.058 | −0.00 |
| 72 | −0.063 | −0.00 |
| 96 | −0.069 | −0.01 |
| 120 | −0.076 | −0.01 |
| 144 | −0.082 | −0.02 |
| 168 | −0.088 | −0.02 |
| 192 | −0.092 | −0.03 |

*Specimen was submerged in a mixture of 30 parts TVOPA-EA/AA and 4 parts CMP and maintained at 135° F.
TVOPA-EA/AA = 1,2,3-tris[1,2-bis(difluoramino)ethoxy]propane-ethyl acrylate/acrylic acid.
CMP = carboranylmethyl propionate.
EPON 1001 = copolymer of bisphenol A and epichlorohydrin which has excellent adhesion, strength, and chemical resistance.

The weight percent change in test specimen Composition B as compared with test specimen Composition A over a test period from 1 to 8 days clearly shows that the leafing aluminum flake sub-surface layer markedly reduces the permeability of the liner-barrier by the carboranyl compounds. The weight loss percent in the control Composition A continued to increase after 24 hours. Thus, the Composition A if used as a liner-barrier in a solid propellant rocket motor would permit migration or diffusion of the carborane from the propellant whereas Composition B if used as a liner-barrier in a solid propellant rocket motor would prevent substantially all migration or diffusion of the carborane from the propellant.

I claim:

1. In combination with a liner-barrier composition selected from the group consisting of an epoxy, polysulfide, and a near neutral phenolic resinous liner-barrier composition that is employed in bonding a carborane-containing ultrahigh burning rate propellant to the surface of a rocket motor case or to the surface of the rocket motor insulation when used, said ultrahigh burning rate propellant having a compositional range of about 5-7 weight percent hydroxyl-terminated polybutadiene binder, of about 8-10 weight percent carborane selected from n-hexylcarborane, a 60/40 mixture of carboranylmethyl ethyl sulfide and carboranylmethyl propyl sulfide, and carboranylmethyl propionate, and of about 10-12 weight percent spheroidal aluminum which is part of a total solids of about 86-87 weight percent which additionally is comprised of ammonium perchlorate having a specific surface area as calculated from Mine Safety Appliance (MSA) in the range of about 3-7 square meters per gram, the improvement to said liner-barrier composition when cured achieved by incorporating from about 2 to about 5 weight percent leafing aluminum flake into said uncured liner-barrier composition used to form the solid matrix of said liner-barrier, said leafing aluminum flake floating to a region near the surface of said uncured liner-barrier composition which is subsequently cured to yield said solid matrix having a substantially uniform sub-surface layer of aluminum flake near the surface thereof, said uniform layer of leafing aluminum flake markedly reducing the permeability of said liner-barrier by said carborane which results from the migration or diffusion of said carborane from said ultrahigh burning rate propellant.

* * * * *